2,989,963
AGRICULTURAL PROCESS
Paul F. Hoffman, Kirkwood, Mo., assignor to Monsanto Chemical Company, St. Louis, Mo., a corporation of Delaware
No Drawing. Filed Apr. 27, 1960, Ser. No. 24,897
10 Claims. (Cl. 131—144)

This invention is directed to the production of high quality tobacco. More specifically the invention provides a means of eliminating or minimizing a tobacco leaf injury known to the industry as "tobacco fleck."

Much research work has been done on the cause and cure of the "tobacco fleck," which has become a serious problem in the production of top quality leaf suitable for cigar wrapping. Attempts have been made to develop fleck resistant strains, but this has not solved the problem. It is well known that the fleck has some relationship to the environment, but the precise causes have not been definitely ascertained. It has been suggested that ozone in the atmosphere may be one of the important factors, but this alone is not responsible. The available data on ozone concentration and incidence of fleck cannot be directly correlated. The occurrence of fleck in recent years in the proximity of concentrations of industry suggests that atmospheric contamination may have a significant part in the cause of the injury.

If ozone is in part responsible for the downgrading of tobacco, it was concluded that the protection of the tobacco from ozone contact would solve the problem. Attempts were made to eliminate ozone by spraying the leaves periodically with ascorbic acid, a known antioxidant, but no beneficial improvement was effected.

The purpose of the present invention is to provide an effective means of preventing "tobacco fleck." A further purpose is to provide a treatment which can be economically practiced in the field. A still further purpose is to provide a spray which will facilitate the treatment of tobacco and effectively prevent the injury regardless of the cause.

It has been found that 2,2,4-trimethyl-1,2-dihydroquinolines can be applied to tobacco leaves and prevent the injury known as "tobacco fleck." The effective compounds have the following characteristic structural formula

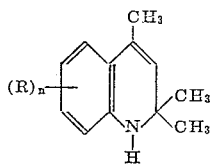

wherein $n$ is an integer from zero (0) to two (2) and R is a radical selected from the group consisting of methyl, ethyl, propyl, isopropyl, n-butyl, isobutyl, the various amyl radicals, phenyl, benzyl, methoxy, ethoxy, propoxy, isopropoxy, the several isomeric butoxy radicals, the several isomeric amyloxy radicals, phenoxy and benzoxy radicals. These compounds are herein identified as 2,2,4-trimethyl-1,2-dihydroquinolines, but the invention is not limited to the use of these alone, homologues and analogues thereof are useful.

Of outstanding significance with respect to cost, availability, and performance is 6-ethoxy-2,2,4-trimethyl-1,2-dihydroquinolines.

This invention is practiced by spraying the leaves with water dispersions of the substituted dihydroquinolines. The treatment may be effected at regular periodic intervals as required. The frequency of treatment and the concentration of the treating formulations will depend upon severity of the fleck usually found in the locality. Concentration may vary from 100 to 10,000 parts per million of water or formulation.

In lieu of regular applications, the need may be anticipated. In many areas the weather and atmospheric conditions known to produce the injury may be recognized and the spray applied before any, or at least serious, damage occurs.

Further details of the practice of this invention are set forth with respect to the following specific example:

Tobacco leaves were sprayed with aqueous dispersions of 6-ethoxy-2,2,4-trimethyl 1,2-dihydroquinoline. Dispersions of both 2,000 and 4,000 parts per million were used. After twenty-four hours while exposed to an atmosphere which produced fleck on untreated leaves, the sprayed leaves were undamaged.

The preparation of useful dispersion involves the suspension of the trimethyldihydroquinolines in water. Being insoluble in water, the active components must be uniformly suspended in the aqueous carrier. For convenient shipment and storage the trimethyldihydroquinolines must be formulated as concentrates which can be readily diluted with water by unskilled workmen to form suspensions which can be used directly as sprays for tobacco growing in the fields or during the drying and/or storage stages.

The oil soluble trimethyldihydroquinolines can be formulated as concentrates in emulsified form or as wettable powders. The emulsion concentrates are viscous, but flowable, suspensions of the active components in media which aid in the preparation of dilute aqueous suspensions by merely mixing with water. The media comprise principally wetting or emulsifying agents or other surface active adjuvants to aid the adherence of the active components to the tobacco as well as to facilitate the suspension in water of the water insoluble components. Optional adjuvants include organic liquids in which the active components are soluble and solid diluents which serve as indicators of the areas treated. The wettable powder concentrates are mixtures of the trimethyldihydroquinolines, surface active agents and higher proportions of solid diluents so that the concentrate will be pulverulent non-caking compositions.

Suitable surface active agents which may be used to the extent of .1 to 20% by weight are well known to those skilled in the art and are widely used in industry. They may be cationic, anionic or nonionic. These agents usually function through inherent molecular groupings of the compounds, some of which groups are attracted to the aqueous phase and other molecular groupings of the same compounds are adsorbed on the solid diluent and/or the active component.

The cationic surface active agents may be quaternary ammonium compounds, such as tetramethyl ammonium chloride and the amine salts, such as octadecyl amine hydrochloride. The essential characteristic of this type of emulsifier is that which is capable of ionization to a negatively charged halogen ion and a positively charged hydrophobic ion. Phosphonium salts and sulfonium salts are also useful. Although a wide variety of cationic emulsifying agents are known, they are in general less important than other types of emulsifying agents.

The non-ionic surface active agents include the molecules wherein the hydrophobic portion and the hydrophilic portion are separated by ether linkages. These include the various ethylene oxide or propylene oxide condensates with fatty alcohols, such as oleyl alcohol to which six moles of ethylene oxide has been added, or the alkyl phenols condensed with ethylene or propylene oxide, such as p-nonyl phenol condensed with eight moles of ethylene oxide. The non-ionic emulsifiers may also contain ester groups separating the hydrophobic and hydrophilic radicals of the compound, for example, glycerol mono-stearate and the mono-oleate of propylene glycol. The non-ionic emulsifiers may also contain amide groups, such as lauryl diethanolamide.

The most significant class of surface active agents are the anionic types, which include the common soaps, such as sodium stearate, sodium palmitate, and rosin soaps. Other types are the sulfated oils, such as the sulfated ester of ricinoleic acid. The sulfate may be based on the alcohols, such as the sodium salt of polyoxyethylene sulfate and sodium alkyl polyoxyethylene sulfate. Other types of anionic emulsifiers are the alkali metal sulfonates of aliphatic hydrocarbons, such as the sodium salt of isothionic acid and the sulfonate of alkyl aromatic hydrocarbons, such as the sodium salt of sulfonated tetradecylbenzene.

The wettable powders are a convenient form for the preparation of concentrated formulations of the trimethyldihydroquinolines which will also include one or more of the surface active agents above identified. Effective solid diluents, preferably pulverulent or granular in form so as to be effective carriers for the active ingredients, are the natual clays, such as china clays, the bentonites and the attapulgites; other minerals in natural state, such as talc, pyrophyllite, quartz, diatomaceous earth, vermiculite, fuller's earth, chalk, rock phosphate and sulfur; and the chemically modified minerals, such as the acid washed bentonite, precipitated calcium phosphate, precipitated calcium carbonate and colloidal silica. These diluents represent a substantial portion of the wettable dust formulations, for example, from 55% to 95% by weight. In the same formulation from 0.1 to 20% of the surface active agent and from about 5 to 25% of the trimethyldihydroquinolines may be present.

If desired the formulations may include in addition to the surface active agent, the solid diluent and the trimethyldihydroquinoline, up to 20% of a suitable solvent for the water insoluble trimethyldihydroquinoline, for example, benzene, toluene, the xylenes, cyclohexane, cyclopentane, n-hexane and homologues and analogues of these. The organic solvents aid in dispersing the active components and facilitate the preparation of stable dispersions for ready use.

The embodiments of the invention in which an exclusive property or privilege is claimed are defined as follows.

I claim:

1. A process for preventing tobacco fleck which comprises contacting the leaves with a 2,2,4-trimethyl-1,2-dihydroquinoline.

2. A process for preventing spotting of tobacco leaves which comprises contacting them with an aqueous dispersion of 100 to 10,000 parts per million of a 2,2,4-trimethyl-1,2-dihydroquinoline.

3. A process for preventing deterioration of tobacco which comprises spraying tobacco exposed to the atmosphere with an aqueous dispersion of 100 to 10,000 parts per million of a 2,2,4-trimethyl-1,2-dihydroquinoline.

4. A process for preventing tobacco fleck which comprises contacting the leaves with a compound of the structure

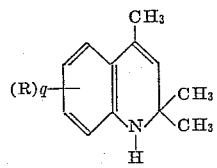

wherein $n$ is an integer from zero (0) to two (2) and R is a radical selected from the group consisting of methyl, ethyl, propyl, isopropyl, n-butyl, isobutyl, the various amyl radicals, phenyl, benzyl, methoxy, ethoxy, propoxy, isopropoxy, the several isomeric butoxy radicals, the several isomeric amyloxy radicals, phenoxy, and benzoxy radicals.

5. A process for preventing deterioration of tobacco which comprises spraying tobacco exposed to the atmosphere with an aqueous dispersion of 100 to 10,000 parts per million of a compound of the structure

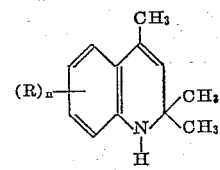

wherein $n$ is an integer from zero (0) to two (2) and R is a radical selected from the group consisting of methyl, ethyl, propyl, isopropyl, n-butyl, isobutyl, the various amyl radicals, phenyl, benzyl, methoxy, ethoxy, propoxy, isopropoxy, the several isomeric butoxy radicals, the several isomeric amyloxy radicals, phenoxy and benzoxy radicals.

6. A process for preventing tobacco fleck which comprises, contacting the leaves with 6-ethoxy-2,2,4-trimethyl-1,2-dihydroquinoline.

7. A process for preventing deterioration of tobacco which comprises spraying tobacco exposed to the atmosphere with an aqueous dispersion of 100 to 10,000 parts per million of 6-ethoxy-2,2,4-trimethyl-1,2-dihydro-quinoline.

8. A concentrate for ready dilution to form dispersions for prevention of spotting on tobacco leaves, which comprises a 2,2,4-trimethyl-1,2-dihydroquinoline of 0.1 to 20% of a surface active agent and from 55 to 95% of a solid diluent.

9. A concentrate for ready dilution to prevent deterioration of tobacco by exposure to the atmosphere which comprises 5 to 25% by weight of a compound of the structure

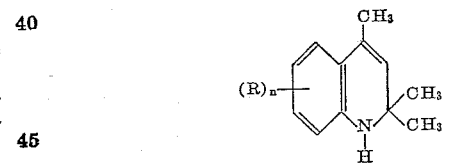

wherein $n$ is an integer from zero (0) to two (2) and R is a radical selected from the group consisting of methyl, ethyl, propyl, isopropyl, n-butyl, isobutyl, the various amyl radicals, phenyl, benzyl, methoxy, ethoxy, propoxy, isopropoxy, the several isomeric butoxy radicals, the several isomeric amyloxy radicals, phenoxy and benzoxy radicals, from 0.1 to 20% of a surface active agent and from 55 to 95% of a solid diluent.

10. A concentrate for ready dilution to prepare dispersions for the prevention of tobacco fleck which comprises from 5 to 25% by weight of 6-ethoxy-1,2,3-trimethyl-1,2-dihydroquinoline, from .1 to 20% of a surface active agent, and from 55 to 95% of a solid diluent.

References Cited in the file of this patent

UNITED STATES PATENTS

| | | |
|---|---|---|
| 2,661,277 | Mowry et al. | Dec. 1, 1953 |
| 2,664,407 | Ingram | Dec. 29, 1953 |
| 2,811,503 | Hand et al. | Oct. 29, 1957 |

OTHER REFERENCES

Tobacco, pages 25–35 of the July 8, 1960 issue. Published in New York, N.Y.

Tobacco, pages 21–28 of the April 1, 1960 issue. Published in New York, N.Y.